May 19, 1925.
F. O'NEILL
GLASS FEEDING APPARATUS
Filed May 14, 1919 4 Sheets-Sheet 3
1,537,961
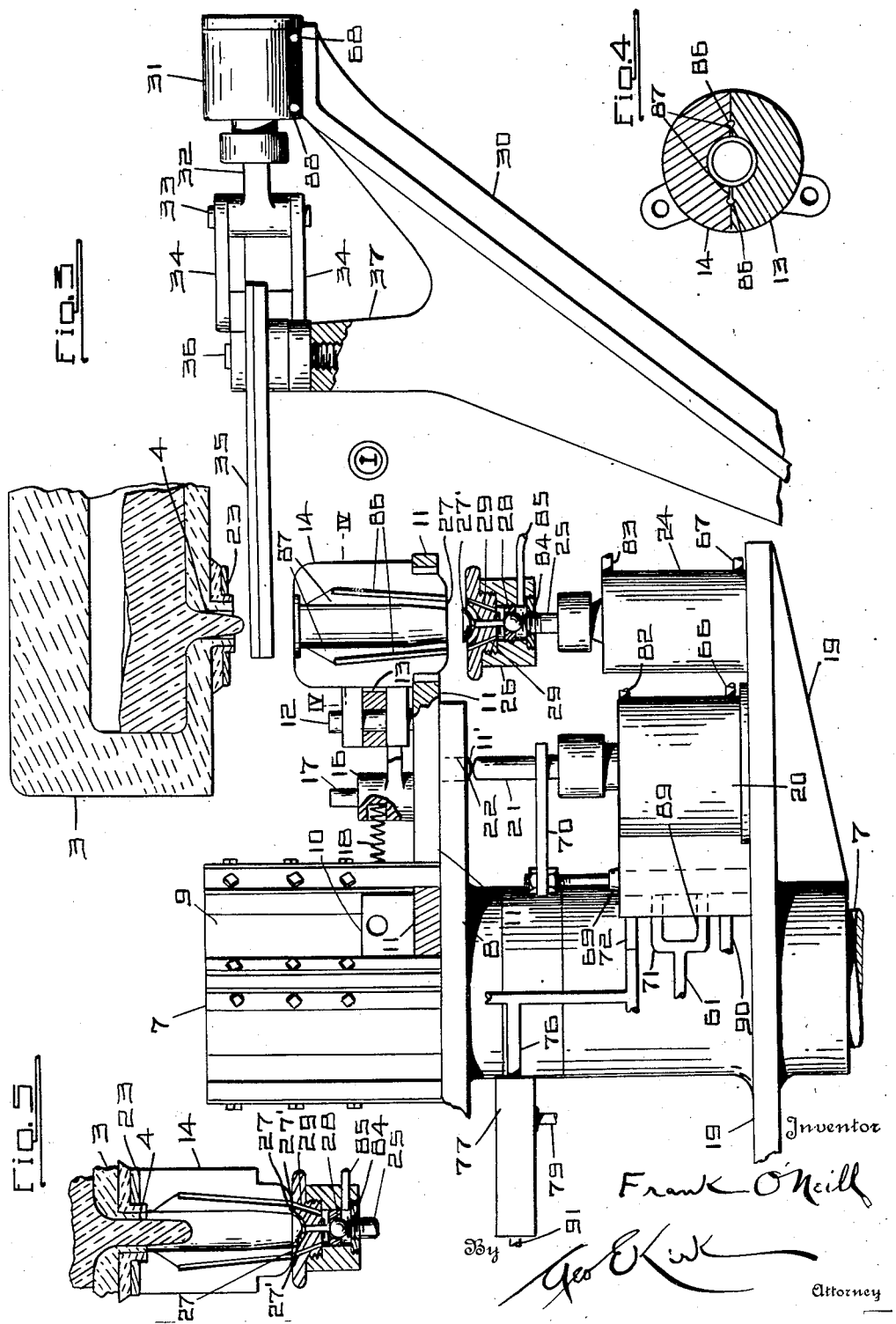
Inventor
Frank O'Neill
By
Geo E Kirk
Attorney

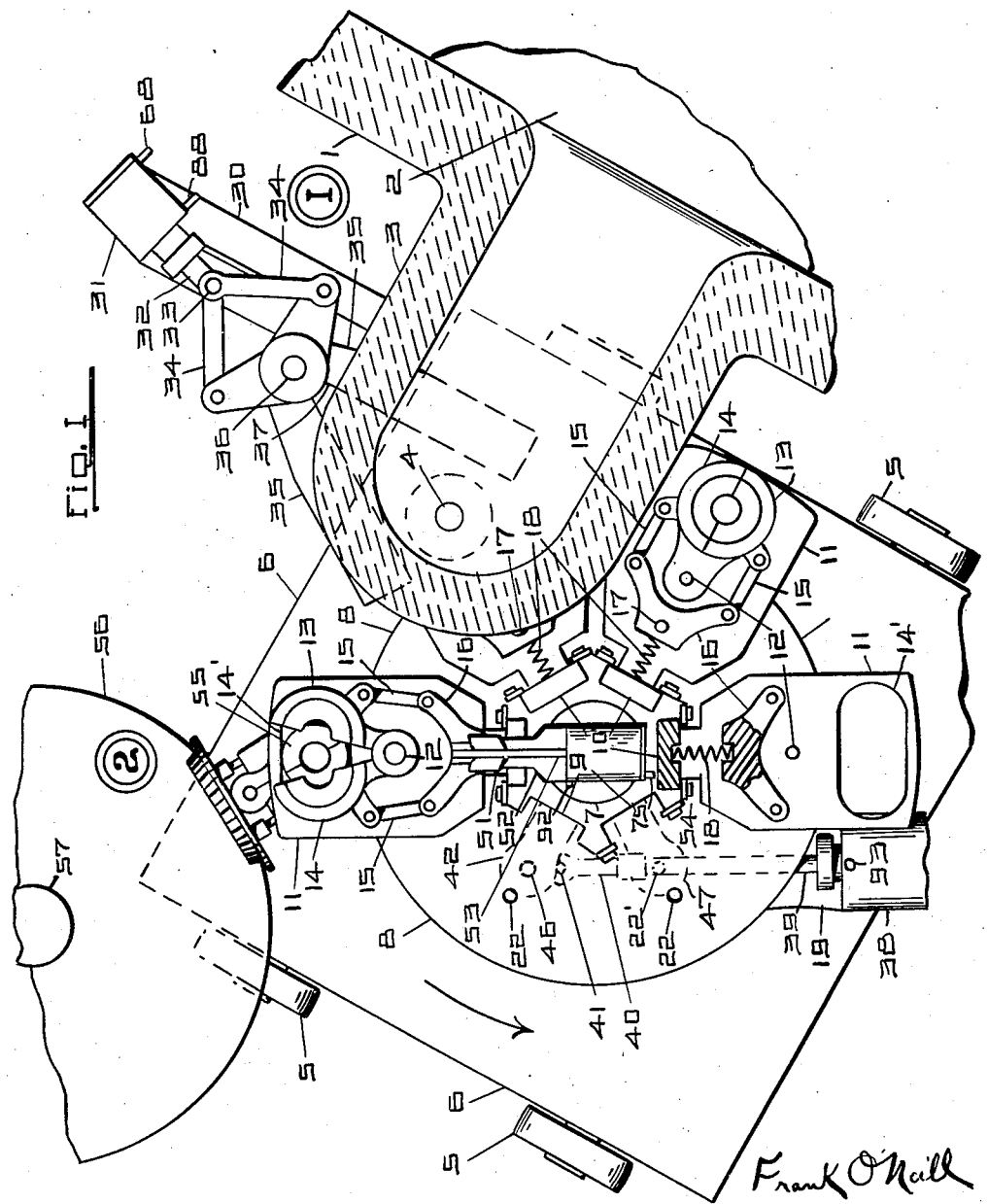

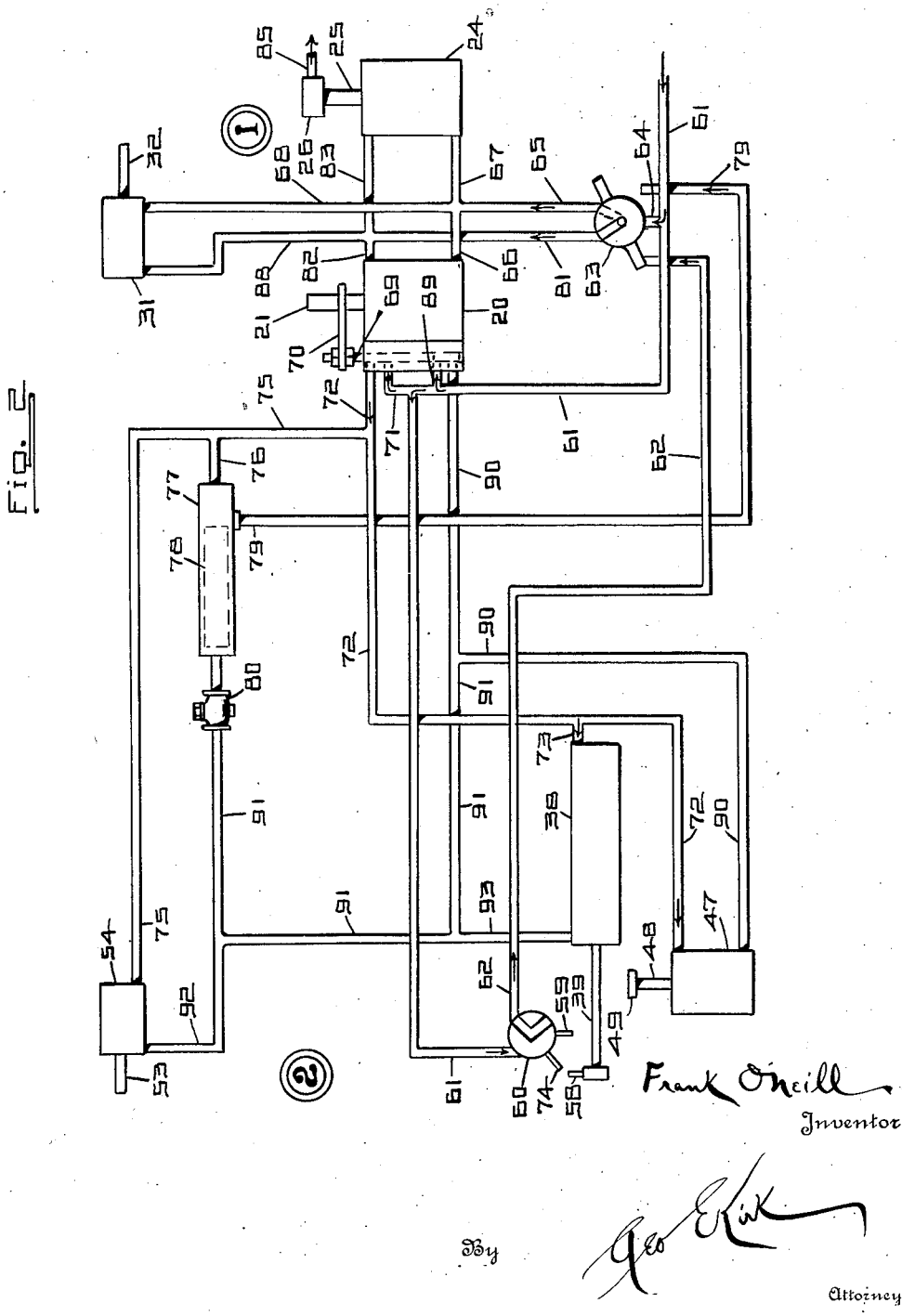

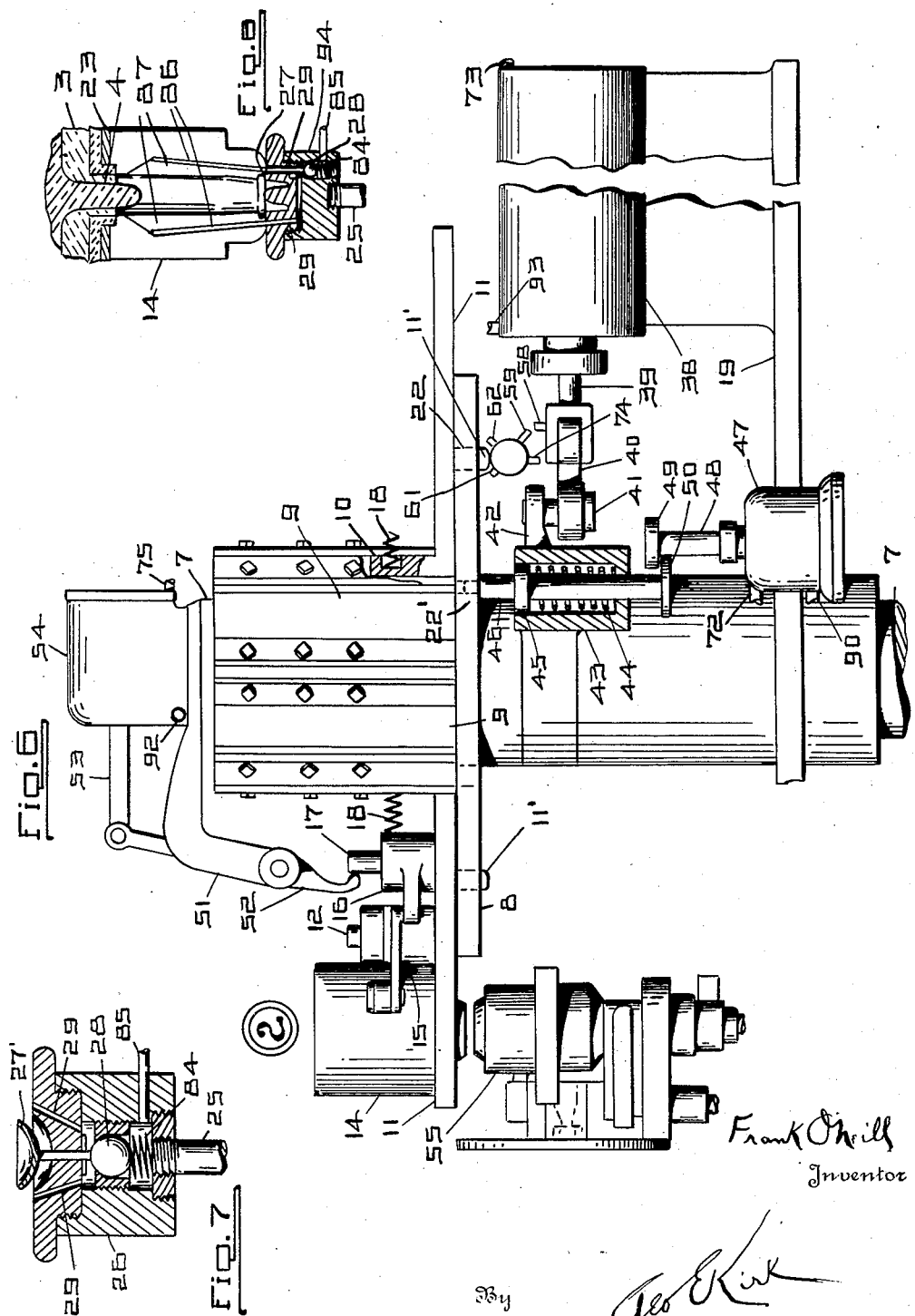

Patented May 19, 1925.

1,537,961

UNITED STATES PATENT OFFICE.

FRANK O'NEILL, OF TOLEDO, OHIO.

GLASS-FEEDING APPARATUS.

Application filed May 14, 1919. Serial No. 297,035.

*To all whom it may concern:*

Be it known that I, FRANK O'NEILL, a citizen of the United States of America, residing at Toledo, Lucas County, Ohio, have invented new and useful Glass-Feeding Apparatus, of which the following is a specification.

This invention relates to procuring from a molten mass definite quantities of material for forming or shaping into articles.

This invention has utility when incorporated in a gatherer for molten glass, especially for cooperation in supplying a forming machine for glass articles, as bottles.

Referring to the drawings:

Fig. 1 is a fragmentary plan view of an embodiment of the gatherer apparatus of the invention herein, in connection with a bottle machine;

Fig. 2 is a power diagram showing interconnection of the devices of the gatherer or glass feeding apparatus of Fig. 1;

Fig. 3 is a side elevation with parts broken away of the glass gathering apparatus at station one;

Fig. 4 is a section on the line IV—IV Fig. 3;

Fig. 5 is a detail view, of the gathering vessel, or cup, in glass receiving position;

Fig. 6 is a side elevation with parts broken away of the glass gathering apparatus at station two;

Fig. 7 is a detail view of the suction valve device; and

Fig. 8 is a view of a glass receiving cup with a neck finish incorporated therewith.

The glass tank 1 has therein a molten pool 2. This pool 2 extends outward into the overhang or extension 3 of the furnace 1. This overhang 3 (Figs. 1, 3) has in the underside thereof an opening or outlet 4 from which there may flow the thick or molten glass from the pool. The molten glass passing from the pool 2 through the outlet 4 is handled by the gatherer or glass feeding apparatus in a more or less formed condition in its delivery to a complete or final forming apparatus for shaping the glass into bottles or other blown or pressed ware as may be found desirable.

The gathering apparatus of this disclosure is shown as a device shiftable to various positions as to a tank and readily adaptable to any desired finish or forming machine. As shown, this gathering device comprises rollers 5 carrying a platform 6 from which rises a central column 7 carrying a rotatable carrier or disk 8. Rising from this disk 8 are vertical guides 9 for portions 10 upstanding as integral with horizontal arms 11 resting normally on the platform 8. These arms 11 are shown as carrying upright pins 12 upon each of which may be pivoted a pair of cup members 13, 14, opposing each other and movable into closed position for receiving a charge of molten glass therein. Connected to each cup member 13, 14, is a link 15 from a crosshead 16 actuable by a pin 17. This crosshead 16 is normally thrust radially outward by a helical spring 18 from an upstanding portion 10 thereby normally maintaining each cup or glass receiving vessel 13, 14, in closed position.

The column 7 has mounted thereon below the carrier 8 a bracket or arm 19 held against rotation. This bracket or arm 19 has thereon upright cylinder 20 which may in its operation, thrust upward pin 21 into openings 22 in the carrier 8 and in passing through such opening 22 it moves the corresponding arm 11 upward by engaging its stud 11'. In such upward movement the carrier 8 brings the vessel or closed cup members 13, 14, into position against seat 23 about the opening or outlet 4 from the tank of molten glass.

The bracket 19 also carries, radially remote from the cylinder 20, a second vertical cylinder 24 having a piston 25 upwardly thrust to carry head 26 into engaging position as to seat 27 below the glass gathering vessels 13, 14. This action of the head 26 strikes the base of the closed vessel 13, 14, for moving member 27' to unseat valve 28 and thus permit vacuum pull by ducts 29.

There is also disposed at this gather station one a bracket 30 rising from the platform 6. This bracket 30 rising from the platform 6 carries horizontal cylinder 31 having piston rod 32 terminating in a vertical pin 33 from which extends a pair of links 34 for engaging the angle rear extension of a pair of shear arms 35 mounted on fixed pivot pin 36 which pivot pin 36 is carried by auxiliary bracket 37 extending from the main bracket 30 carrying the cylinder 31. This shear device is effective, when the cylinders 20, 24, have their rods 21, 25, respectively, start to lower the arm 11, to bring the shear arms 35 together adjacent the seat 23 at the outlet opening 4, and thus shear off a determined or definite quantity of the flowing molten glass as the cup or vessel 13, 14, recedes from the opening. There is thus measured a definite volume of the molten glass into each cup 13, 14.

The action of the pin 21 from the cylinder 20 at station one, is to serve not only for lifting the radial arm 11 but also for anchoring the carrier 8 against rotative movement while there is an operation occurring at station one. In the withdrawal of this pin 21 from anchoring or holding position as to the carrier 8, the carrier 8 is in condition for a shifting of its adjacent vessel or cup 13, 14, for charging or receiving a supply at station one.

In the instance herewith the carrier 8 is shown as having an annular series of these cups or vessels 13, 14, there being shown here six of such vessels or cups and to correspond therewith six arms 11. Centrally of each arm 11 the carrier 8 is provided with a hole or seat 22.

The intermittent driving or step by step rotation of the carrier 8 is effected from horizontal cylinder 38 (Figs. 1, 2, 6) carried by the bracket 19 in a position below the carrier plate 8. This cylinder 38 has piston rod 39 provided with link 40 extending to pin 41 engaging drive plate 42 mounted for oscillation upon the column 7 just below the carrier plate 8. This driving plate 42 carries a housing 43 having mounted therein a spring 44 normally upwardly thrusting against collar 45 of vertical pin 46 to urge the pin 46 into an opening 22′ of the carrier plate 8. Accordingly in driving the carrier plate 8 from the position of rest, the cylinder 38 may have its piston rod 39 retracted into such cylinder 38 and thereby pull the drive plate 42 and carrier 8 angularly to shift the carrier 8 a definite distance between the cups 13, 14, in this instance shown as 60°.

When this shifting action or driving of the plate 8 is completed, the driving plate 42 is brought into position adjacent cylinder 47. This cylinder 47 is vertically disposed and carried by the bracket 19. The cylinder 47 has vertical piston rod 48 provided with a terminal collar 49 adjacent which in this position of the pin 46 there is a flange head 50 of the pin 46. Accordingly such a downward movement of the piston rod 48, when this full shifting position of the plate 8 has been effected by the driving plate 42, immediately results in a withdrawal of the pin 46 from the plate 8. The action of the cylinder 38 may now be such as to thrust the piston rod 39 outward and allow the pin 46 to be moved away from the pin 48 and its collar 49. In moving away from the collar 49 the pin 46 slides along on the underside of the plate 8 until it comes into engagement with the next opening 22′ in the plate 8. Before this pin 46 has been withdrawn for this recover travel, the pin 21 at cylinder 20 has moved into engaging position. Accordingly the carrier 8 is either locked for driving or locked against driving at all times.

This shifting of the gathered molten glass in cup or vessel 13, 14, from station one, is shown as directly to station two (Figs. 1, 2, 6). At station two the column 7 carries at its top a projecting bracket 51 for lever 52 connected at its upper end to piston rod 53 in horizontal cylinder 54 mounted on the non-rotative, or stationary column 7. Thrusting of the piston rod 53 outward from the cylinder 54 causes the lower end of lever 52 to move inward and in such movement inward, it pushes the pin 17 causing a cross head 16 to compress its spring 18 and thereby, through such crosshead 16 and its links 15, the cup sections 13, 14, are opened by swinging apart upon the common pivot pin 12. The gather of glass may accordingly be dropped from the gather vessel 13, 14, through opening 14′ in arm 11 into a mold, say a blank mold 55 of a machine of a desired type for doing the pressing or blowing or other finishing operations in the manufacture of an article of ware.

In this instance the blank mold 55 is shown as mounted upon a rotary carrier 56, carried by a central column 57 for a blank mold operation. Such blank mold carrier 56 may be disposed adjacent a finish mold carrier say as shown in Patent 1,217,102 or copending application S. N. 250,488 filed August 19, 1918.

The power apparatus in this instance of the ware finishing device is shown as of the pneumatic or air type. As to sequence of operation, the inward pull of the piston rod 39 adjacent the end of each driving stroke for the drive plate 42 and carrier 8 may have pin 58 strike pin 59 to actuate valve 60 to permit flow of power air from main line 61 as power air to line 62 to shift rocker valve 63 in thereby allowing power air to flow by branch 64 to line 65 having branch 66 to the cylinder 20, and branch 67 to the cylinder 24, at station one to cause upward strokes of the pistons 21 and 25. Line 68 from the line 65 extends to the shear cylinder 31 to draw piston rod 31 thereinto to open the shear 35.

Directly following this locking of carrier 8 by the piston 21 and incident thereto through the action of valve 69 actuated by the bracket 70 carried by the piston rod 21, power air by branch 71, flows by line 72, extending to the top of the cylinder 47 for drawing piston 48 thereinto, thus effecting unclutching of the plate 42 from the carrier 8. A branch line 73 from air line 72 now supplies power air for giving the idle travel stroke of piston rod 39 out of the cylinder 38. In this travel the pin 58 strikes pin 74 to shift the valve 60 to the cut off position thus releasing the rocker valve 63. Furthermore from this line 72 extends a branch 75 to the after end of the cylinder 54 at station two causing outward movement of the piston rod 53 to open the gather vessel 13, 14, while the blank mold 5 at station two is in position to receive each charge or gather as dropped or released thereinto.

From power air line 75 is a branch 76 to timing tank or retarding valve 77 having plunger 78 shifted to clear the lateral port of line 79 at a rate as controlled by adjustable escape valve 80. This flow of air by way of the line 79 reverses the shifting of the rocker valve 63 to permit flow of power air by way of line 81 from the lines 61, 64, to branch 82, to the upper end of the cylinder 20 for lowering the piston rod 21 out of holding or locking relation for the carrier 8. Simultaneously the line 83 extends to the upper end of cylinder 24 at station one for movement of the piston rod 25 inward, thus allowing spring 84 in the head 26 (Fig. 7) automatically to cut off the action of suction air by line 85.

The suction action is distributed in its drawing of the glass gather from the tank through the opening 4 by the action of duct sections 86 in the opposing cup members 13, 14, to provide therefrom a slight slot or vent region 87. The plastic glass is thus drawn fully to fill or be distributed throughout the gather cup as a determined volume.

The line 81 has a branch 88 to the after end of the cylinder 31 causing the piston rod 32 to be forced outward therefrom in operating the shear 35 to sever the glass gather in the cup 13, 14, as the cup is lowered. This completion of the operation at station one brings about automatically a completion of the cycle or sequence of operations. The valve 69 is, by the air from line 82, shifted downward, due to inward travel of the piston rod 31, and permits flow of power air from the main 61 by branch 89 to line 90 to lift or set piston rod 48 in its upper position. From this line 90 extends a branch 91 to valve 80 and thence to the timing tank 77 to set the piston 78 therein to close the port to the line 79. A branch 92 from the line 91 extends to the piston rod end of the cylinder 54 to draw the piston rod 53 thereinto, thus placing the lever 52 in position to open the next gather cup 13, 14. The gather cup 13, 14 emptied at station two is automatically closed by its spring 18 as it leaves station two and is held closed in its complete circuit until again reaching station two in its circuit of travel. Branch line 93 from the line 91 to the piston rod end of the cylinder 38 draws the piston rod 39 into such cylinder 38 as the driving stroke from swinging the plate 42 and carrier 8, as well as rocking the valve 60 for an automatic starting of the power control in the repetition of the cycle of operations for the continuous manufacture of glass-ware with the gatherer or feeding device of the apparatus herein. The suction head 94 (Fig. 8) is shown of such shape as to form a bottle lip or neck finish for the ware. The gather as so operating may permit omission of the neck forming as a subsequent operation and furnish a formed portion for handling the partially formed ware in taking to the complete forming station.

What is claimed and it is desired to secure by United States Letters Patent is:—

1. A glass tank having a pool of molten glass, said tank having a projecting portion into which the pool extends, said portion being provided with a bottom outlet, relatively movable sectional suction means for withdrawing glass from the pool through the outlet, said means being movable laterally to a position adjacent said outlet, and then directly toward said outlet into sealing position at said outlet and then downward, and a shear operable relatively to the means for severing the molten glass from said means.

2. A gatherer comprising a rotary carrier, receiving vessels mounted on the carrier, said vessels each comprising a pair of hinged sections, a supply having a flow-off outlet, and means for shifting the vessels as to the carrier into position as to the outlet, and a shear operable relatively to the vessel and the outlet and between the vessel and outlet for cutting off a gather of glass for the vessel.

3. A glass tank having a submerged outlet, a gather receiving vessel, means for shifting the vessel into position to seal the outlet from the tank, suction means coacting through the vessel, mechanism for effecting downward movement of the vessel from the outlet, a pair of movable members to cut off a charge of glass into the vessel from the tank, a blank mold, driving means for shifting the cutoff charge-carrying vessel laterally into position over the blank mold, and means for opening the vessel to drop the charge into the blank mold.

4. A gatherer embodying a sectional vessel, a carrier for shifting the charge carrying vessel, a lifter for moving the vessel as to the carrier into charge receiving position independently of said shifting and returning such charge filled vessel to position on the carrier, driving means for shifting the charge-filled vessel and carrier and means for opening the vessel to drop the charge therefrom.

In witness whereof I affix my signature.

FRANK O'NEILL.